United States Patent
Pfau

(10) Patent No.: US 11,524,680 B2
(45) Date of Patent: Dec. 13, 2022

(54) CONTROL DEVICE AND CONTROL METHOD FOR CONTROLLING BEHAVIOR OF MOTORCYCLE

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 124 days.

(21) Appl. No.: 16/770,053

(22) PCT Filed: Dec. 4, 2018

(86) PCT No.: PCT/IB2018/059601
§ 371 (c)(1),
(2) Date: Jun. 4, 2020

(87) PCT Pub. No.: WO2019/111139
PCT Pub. Date: Jun. 13, 2019

(65) Prior Publication Data
US 2021/0162998 A1    Jun. 3, 2021

(30) Foreign Application Priority Data

Dec. 6, 2017 (JP) .............................. JP2017-234051

(51) Int. Cl.
*B60W 30/16* (2020.01)
*B62J 45/20* (2020.01)

(52) U.S. Cl.
CPC .............. *B60W 30/16* (2013.01); *B62J 45/20* (2020.02); *B60W 2300/36* (2013.01);
(Continued)

(58) Field of Classification Search
None
See application file for complete search history.

(56) References Cited

U.S. PATENT DOCUMENTS

| 2006/0217866 A1* | 9/2006 | Moebus ............. B60K 31/0008 |
| | | 701/93 |
| 2009/0125160 A1 | 5/2009 | Desai et al. |

(Continued)

FOREIGN PATENT DOCUMENTS

| CN | 106840181 A | 6/2017 |
| CN | 107364445 A | 11/2017 |

(Continued)

OTHER PUBLICATIONS

Sakai, Machine Translation of WO2017/030131, Feb. 2017, espacenet.com (Year: 2017).*

(Continued)

*Primary Examiner* — David P. Merlino
(74) *Attorney, Agent, or Firm* — Michael Best & Friedrich LLP

(57) ABSTRACT

The present invention provides a control system and a control method capable of appropriately supporting driving of a motorcycle by a rider. The control system includes a tracking target vehicle identifying unit that identifies a tracking target vehicle of adaptive cruise operation, a vehicle position information acquiring unit that acquires information on the relative position of the tracking target vehicle with respect to the motorcycle during traveling, a control amount setting unit that sets a control amount in the adaptive cruise operation, and an execution unit that causes the motorcycle to execute the adaptive cruise operation, and further includes a lane position information acquiring unit that acquires information on the relative position of a lane boundary with respect to the motorcycle during traveling, in which the tracking target vehicle identifying unit identifies the tracking target vehicle, based on the position information acquired by the lane position information acquiring unit.

8 Claims, 2 Drawing Sheets

(52) U.S. Cl.
CPC ..... *B60W 2420/42* (2013.01); *B60W 2552/10* (2020.02); *B60W 2552/53* (2020.02); *B60W 2554/4041* (2020.02); *B60W 2554/802* (2020.02)

(56) References Cited

U.S. PATENT DOCUMENTS

| | | |
|---|---|---|
| 2013/0245886 A1 | 9/2013 | Fung et al. |
| 2017/0144665 A1* | 5/2017 | Ohashi ................. B60W 30/16 |
| 2017/0327123 A1 | 11/2017 | Rajvanshi et al. |
| 2017/0341647 A1 | 11/2017 | Tokimasa et al. |
| 2019/0061758 A1* | 2/2019 | Ide ....................... B60W 30/16 |
| 2019/0080187 A1* | 3/2019 | Inoue ................. G06K 9/6293 |
| 2019/0168758 A1* | 6/2019 | Matsumoto ........... B60W 40/04 |
| 2019/0315355 A1* | 10/2019 | Tokimasa ............... B60K 31/00 |

FOREIGN PATENT DOCUMENTS

| | | | |
|---|---|---|---|
| DE | 102014226462 A1 * | 6/2016 | |
| JP | 2009116882 | 5/2009 | |
| WO | 2017030131 | 2/2017 | |
| WO | WO-2017030132 A1 * | 2/2017 | ............ B60T 8/1706 |

OTHER PUBLICATIONS

Fujii; Machine Translation of WO-2017030132-A1, Feb. 2017, espacenet.com (Year: 2017).*

Kastner R; Machine translation of DE-102014226462-A1; Jun. 2016; espacenet.com (Year: 2016).*

International Search Report for Application No. PCT/IB2018/059601 dated Feb. 22, 2019 (English Translation, 2 pages).

* cited by examiner

CONTROL DEVICE AND CONTROL METHOD FOR CONTROLLING BEHAVIOR OF MOTORCYCLE

BACKGROUND OF THE INVENTION

This disclosure relates to a control system and a control method capable of appropriately supporting operation of a motorcycle by a rider.

As a technique relating to a motorcycle (automobile bicycle or automobile tricycle) in the related art, there is a technique for supporting driving by a rider. For example, JP-A-2009-116882 discloses a driver support system that warns the rider of the motorcycle that inappropriately approaching an obstacle, based on an output of a detection device for detecting the obstacle in a traveling direction or substantially in the traveling direction.

SUMMARY OF THE INVENTION

Incidentally, in order to support the driving by the rider, it is conceivable to cause the motorcycle to execute adaptive cruise operation. In the adaptive cruise operation, a preceding vehicle in a traveling lane on which the motorcycle travels is identified as a tracking target vehicle, information on relative positions of the motorcycle and the tracking target vehicle is acquired, and behavior of the motorcycle is controlled so that a distance from the motorcycle to the tracking target vehicle approaches a distance reference value.

Here, regarding the adaptive cruise operation executed in a wide vehicle (for example, passenger car, truck or the like having four wheels), the adaptive cruise operation is already widely used, and various methods for identifying the tracking target vehicle are already established. However, regarding the adaptive cruise operation executed in the motorcycle, there is a problem that a suitable method for identifying the tracking target vehicle is unknown. That is, since the motorcycle has a narrow vehicle width, a degree of freedom of a traveling position is large in a transverse direction of the traveling lane. Therefore, in a case where the motorcycle is caused to execute the adaptive cruise operation, compared with a case where the wide vehicle is caused to execute the adaptive cruise operation, specific difficulty of the tracking target vehicle is high. In a case where the motorcycle is caused to execute adaptive cruise, a method capable of appropriately identifying the tracking target vehicle is required to be established from the viewpoint different from the adaptive cruise operation executed in the wide vehicle.

The present invention has been made in view of the above-described problem, and provides a control system and a control method capable of appropriately supporting driving of a motorcycle by a rider.

According to the present invention, there is provided a control system which is a control system which controls behavior of a motorcycle, including a tracking target vehicle identifying unit that identifies a tracking target vehicle of adaptive cruise operation, a vehicle position information acquiring unit that acquires vehicle position information serving as information on the relative position of the tracking target vehicle with respect to the motorcycle during traveling, a control amount setting unit that sets a control amount in the adaptive cruise operation, based on the vehicle position information acquired by the vehicle position information acquiring unit, an execution unit that causes the motorcycle to execute the adaptive cruise operation according to the control amount set by the control amount setting unit, and a lane position information acquiring unit that acquires lane position information serving as information on the relative position of a lane boundary with respect to the motorcycle during traveling, in which the tracking target vehicle identifying unit identifies the tracking target vehicle, based on the lane position information acquired by the lane position information acquiring unit.

According to the present invention, there is provided a control method including a tracking target vehicle identifying step of identifying a tracking target vehicle of adaptive cruise operation, a vehicle position information acquiring step of acquiring vehicle position information serving as information on the relative position of the tracking target vehicle with respect to the motorcycle during traveling, a control amount setting step of setting a control amount in the adaptive cruise operation, based on the vehicle position information acquired in the vehicle position information acquiring step, an execution step of causing the motorcycle to execute the adaptive cruise operation according to the control amount set in the control amount setting step, and a lane position information acquiring step of acquiring a lane position information serving as information on the relative position of a lane boundary with respect to the motorcycle during traveling, in which in the tracking target vehicle identifying step, based on the lane position information acquired in the lane position information acquiring step, the tracking target vehicle is identified.

In the control system and the control method according to the present invention, when the adaptive cruise operation is executed in the motorcycle, the tracking target vehicle is identified, based on the information on the relative position of the lane boundary with respect to the motorcycle. That is, the tracking target vehicle is identified after it is determined where the traveling motorcycle is located in the transverse direction of the traveling lane. Therefore, it is possible to realize the appropriate adaptive cruise operation specialized in the motorcycle having a characteristic that a degree of freedom of the traveling position is large in the transverse direction of the traveling lane.

DETAILED DESCRIPTION

Figure 1:
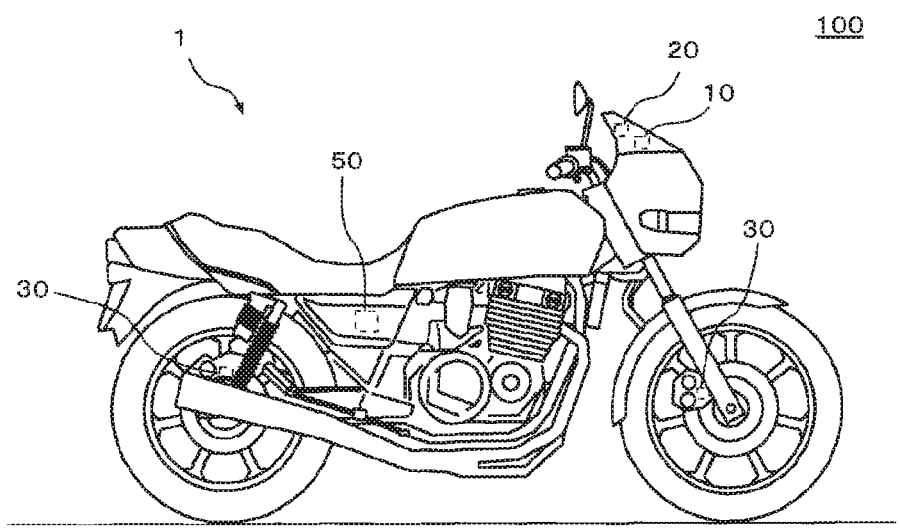
FIG. 1 is a diagram illustrating a mounting state in a motorcycle of a behavior control system according to Embodiment 1 of the present invention.

Hereinafter, a control system and a control method according to the present invention will be described with reference to the drawings.

A term "motorcycle" means a motor bicycle or a motor tricycle among straddle-type vehicles on which riders straddle. In addition, in the following, a case where the motorcycle is the motor bicycle will be described, and the motorcycle may be the motor tricycle.

In addition, the configurations, processing, and the like described below are merely examples, and the control system and the control method according to the present invention are not limited to the case of such a configuration, processing, and the like. In addition, in the following, the same or similar description is simplified or omitted as appropriate. In addition, in each drawing, identical or similar members or portions are not provided with reference numerals or are given the same reference numerals. In addition, for the detailed structure, illustration is simplified or omitted as appropriate.

Embodiment 1

Hereinafter, a behavior control system according to Embodiment 1 will be described.
<Configuration of Behavior Control System>
The configuration of the behavior control system according to Embodiment 1 will be described.

Figure 2:
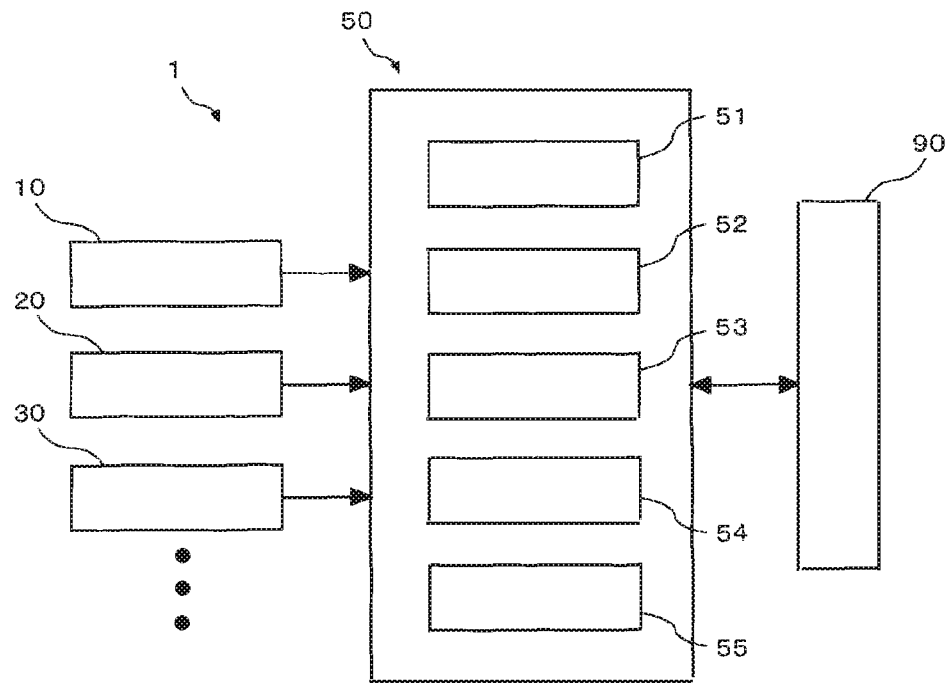
FIG. 2 is a diagram illustrating a system configuration of the behavior control system according to Embodiment 1 of the present invention.
Figure 3:
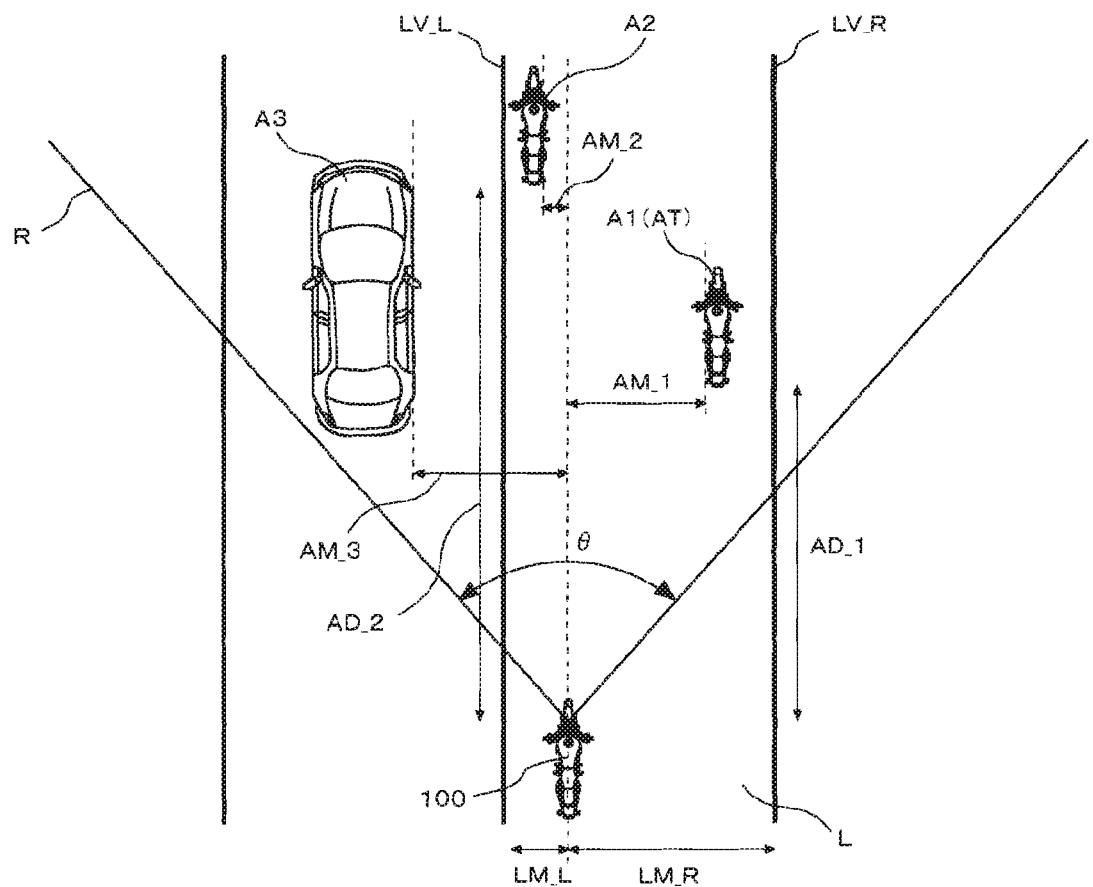
FIG. 3 is a diagram for describing processing of a tracking target vehicle identifying unit of a control system of the behavior control system according to Embodiment 1 of the present invention.

FIG. 1 is a diagram illustrating a mounting state in a motorcycle of a behavior control system according to Embodiment 1 of the present invention. FIG. 2 is a diagram illustrating a system configuration of the behavior control system according to Embodiment 1 of the present invention. FIG. 3 is a diagram for describing processing of a tracking target vehicle identifying unit of a control system of the behavior control system according to Embodiment 1 of the present invention.

As illustrated in FIG. 1, the behavior control system 1 is mounted on a motorcycle 100. The behavior control system 1 includes at least an image sensor 10 that captures a traveling road surface of the motorcycle 100, a distance measuring sensor 20 that receives reflection from a front of the motorcycle 100, a speed sensor 30 for recognizing the traveling speed of the motorcycle 100, and a control system (ECU) 50.

The image sensor 10 is attached to a front portion or a side portion of the motorcycle 100 in a state facing the traveling road surface. A detection range of the image sensor 10 is an area capable of capturing lane boundaries LV_R and LV_L on both sides defining a transverse direction of a traveling lane L on which the motorcycle 100 is traveling (refer to FIG. 3). The lane boundaries LV_R and LV_L on both sides may be captured by one image sensor 10 or may be captured by separate image sensors 10.

The distance measuring sensor 20 is attached to the front portion of the motorcycle 100 in a state facing forward. The distance measuring sensor 20 is, for example, a Radar sensor, a Lidar sensor, an ultrasonic sensor, a stereo vision sensor, or the like, and detects a distance and direction from the motorcycle 100 to an object located ahead of the motorcycle 100. The distance measuring sensor 20 may be other detection device capable of acquiring a traffic situation ahead of the motorcycle 100, or may also have a function of the image sensor 10.

The speed sensor 30 is attached to a moving portion of the motorcycle 100. For example, the speed sensor 30 detects rotational speeds of a front wheel and a rear wheel of the motorcycle 100. The speed sensor 30 may be any sensor as long as the sensor can recognize the traveling speed of the motorcycle 100.

As illustrated in FIG. 2, the control system 50 includes a lane position information acquiring unit 51, a tracking target vehicle identifying unit 52, a vehicle position information acquiring unit 53, a control amount setting unit 54, and an execution unit 55. Each of the units of the control system 50 may be provided collectively in one casing or may be divided into a plurality of casings. In addition, a portion or all of the control system 50 may be configured to include, for example, a microcomputer, a microprocessor unit, or the like, or may be configured to include updatable items such as firmware, or may be a program module or the like executed according to a command from a CPU.

Outputs of various sensors (image sensor 10, distance measuring sensor 20, speed sensor 30, and the like) are input to the control system 50. In addition, the control system 50 outputs a signal to a behavior control mechanism 90 to control behavior of the motorcycle 100. The behavior control mechanism 90 includes a wheel braking mechanism, an engine driving mechanism, and the like. That is, the control system 50 is a device that is responsible for controlling the behavior control mechanism 90 mounted on the motorcycle 100. A traveling direction of the motorcycle 100 is not automatically controlled, and varies depending on the operation of the motorcycle 100 by the rider.

The lane position information acquiring unit 51 acquires the lane position information serving as the information on the relative positions of the lane boundaries LV_R and LV_L (refer to FIG. 3) with respect to the motorcycle 100 during traveling, based on the output of the image sensor 10.

Specifically, in the situation illustrated in FIG. 3, the lane position information acquiring unit 51 acquires lane margins LM_R and LM_L, based on the positions of the lane boundaries LV_R and LV_L in the image captured by the image sensor 10. The lane margin LM_R is defined as a distance from the motorcycle 100 to the lane boundary LV_R on the right side in the transverse direction of the traveling lane L. In addition, the lane margin LM_L is defined as a distance from the motorcycle 100 to the lane boundary LV_L on the left side in the transverse direction of the traveling lane L.

The lane margins LM_R and LM_L may be defined as the distances from the image sensor 10 to the lane boundaries LV_R and LV_L, or it may also be defined as the distances from each portion of the motorcycle 100 to the lane boundaries LV_R and LV_L. In addition, the lane margins LM_R and LM_L may be defined as the distances from the motorcycle 100 to the center of the lane boundaries LV_R and LV_L, or it may also be defined as the distances from the motorcycle 100 to the edges of the lane boundaries LV_R and LV_L on the side closer to the motorcycle 100. In addition, the lane boundaries LV_R and LV_L may be defined as lane marks themselves, or it may also be defined as imaginary boundaries connecting two lane marks intermittently disposed side by side in the traveling direction of the motorcycle 100. In addition, the lane position information acquiring unit 51 may acquire other physical quantities that can be substantially converted into the lane margins LM_R and LM_L as the lane margins LM_R and LM_L. For example, the lane position information acquiring unit 51 may acquire other distances that can be substantially converted into the distance from the motorcycle 100 to the lane boundaries LV_R and LV_L in the transverse direction of the traveling lane L as the lane margins LM_R and LM_L, or may acquire the number of pixels of the image sensor 10 as the lane margins LM_R and LM_L.

The tracking target vehicle identifying unit 52 identifies a tracking target vehicle AT when the motorcycle 100 executes adaptive cruise operation, based on the output of the distance measuring sensor 20 and the lane position information acquired by the lane position information acquiring unit 51.

Specifically, in the situation illustrated in FIG. 3, the tracking target vehicle identifying unit 52 first determines all the preceding vehicles A1, A2, and A3 located within the detection range R of the distance measuring sensor 20, based on the output of the distance measuring sensor 20. Here, the characteristics (for example, width, direction, and the like) of the detection range R may be controllable or uncontrollable.

The tracking target vehicle identifying unit 52 acquires the preceding vehicle margins AM_1, AM_2, and AM_3 defined as the distance from the motorcycle 100 to each of the preceding vehicles A1, A2, and A3 in the transverse direction of the traveling lane L, based on the output of the distance measuring sensor 20. The tracking target vehicle identifying unit 52 compares the magnitude relation between the preceding vehicle margins AM_1, AM_2, and AM_3 and the lane margins LM_R and, LM_L to extract the preceding vehicles A1 and A2 located on the traveling lane L on which the motorcycle 100 is traveling. That is, the preceding vehicle A3 that is not located on the traveling lane L is excluded from candidates for the tracking target vehicle AT.

For example, in order to determine whether or not the preceding vehicle A1 is located on the traveling lane L, the tracking target vehicle identifying unit 52 compares the preceding vehicle margin AM_1 with the lane margin LM_R related to the lane boundary LV_R on the side opposite to the motorcycle 100 with reference to the preceding vehicle A1, and in a case where the preceding vehicle margin AM_1 is smaller than the lane margin LM_R, determines that the preceding vehicle A1 is located on the traveling lane L. On the other hand, in a case where the preceding vehicle margin AM_1 is larger than the lane margin LM_R, it is determined that the preceding vehicle A1 is not located on the traveling lane L.

The preceding vehicle margins AM_1, AM_2, and AM_3 may be defined as the distances from the distance measuring sensor 20 to the preceding vehicles A1, A2, and A3, or it may also be defined as the distances from each portion of the motorcycle 100 to the preceding vehicles A1, A2, and A3. In addition, the preceding vehicle margins AM_1, AM_2, and AM_3 may be defined as the distances from the motorcycle 100 to the positions closest to the motorcycle 100 of the preceding vehicles A1, A2, and A3, or it may also be defined as the distances from the motorcycle 100 to the rear ends on the axles of the preceding vehicles A1, A2, and A3. In addition, the tracking target vehicle identifying unit 52 may acquire other physical quantities that can be substantially converted into the preceding vehicle margins AM_1, AM_2, and AM_3 as the preceding vehicle margins AM_1, AM_2, and AM_3. For example, the tracking target vehicle identifying unit 52 may acquire other distances that can be substantially converted into the distance from the motorcycle 100 to the preceding vehicles A1, A2, and A3 in the transverse direction of the traveling lane L as the preceding vehicle margins AM_1, AM_2, and AM_3.

When the preceding vehicles A1 and A2 located on the traveling lane L on which the motorcycle 100 is traveling are extracted, the tracking target vehicle identifying unit 52 acquires the distances AD_1 and AD_2 between the motorcycle 100 in the traveling direction of the motorcycle 100 and each of the preceding vehicles A1 and A2, based on the output of the distance measuring sensor 20. The shortest distance of the distances AD_1 and AD_2 is identified and the preceding vehicle A1 corresponding to the shortest distance AD_1 is identified as the tracking target vehicle AT.

The distances AD_1 and AD_2 may be defined as the distances from the distance measuring sensor 20 to the preceding vehicles A1 and A2, or it may also be defined as the distances from each portion of the motorcycle 100 to the preceding vehicles A1 and A2. In addition, the distances AD_1 and AD_2 may be defined as the distances from the motorcycle 100 to the rear ends on the axles of the preceding vehicles A1 and A2, or it may also be defined as the distances from the motorcycle 100 to the positions closest to the motorcycle 100 of the preceding vehicles A1 and A2. In addition, the tracking target vehicle identifying unit 52 may acquire other physical quantities that can be substantially converted into the distances AD_1 and AD_2 as the distances AD_1 and AD_2. For example, the tracking target vehicle identifying unit 52 may acquire the distances between the motorcycle 100 in the extending direction of the traveling lane L and each of the preceding vehicles A1 and A2 as the distances AD_1 and AD_2, or may acquire the linear distances between the motorcycle 100 and each of the preceding vehicles A1 and A2 as the distances AD_1 and AD_2.

The vehicle position information acquiring unit 53 acquires vehicle position information serving as information on the relative position of the tracking target vehicle AT with respect to the motorcycle 100 during traveling. Specifically, the distance AD_1 between the motorcycle 100 and the preceding vehicle A1 in the traveling direction of the motorcycle 100, acquired by the tracking target vehicle identifying unit 52, is acquired as the vehicle position information. The vehicle position information acquiring unit 53 may separately acquire the distance AD_1 without diverting the distance AD_1 acquired by the tracking target vehicle identifying unit 52.

The control amount setting unit 54 sets a control amount in the adaptive cruise operation, based on the vehicle position information acquired by the vehicle position information acquiring unit 53 and the output of the speed sensor 30. Specifically, the control amount setting unit 54 sets the control amount (speed, acceleration, and the like) such that the distance AD_1 approaches a distance reference value. The distance reference value is set to a value that can ensure the safety of the rider as the distance from the motorcycle 100 to the tracking target vehicle AT. In addition, the control amount setting unit 54 sets the control amount (speed, acceleration, and the like) such that the traveling speed of the motorcycle 100 does not exceed the speed reference value. The speed reference value can be appropriately set, for example, by the rider.

The execution unit 55 causes the motorcycle 100 to execute the adaptive cruise operation according to the control amount set by the control amount setting unit 54. Specifically, the execution unit 55 outputs a signal corresponding to the control amount set by the control amount setting unit 54 to the behavior control mechanism 90.

<Processing of Behavior Control System>

Processing of the behavior control system according to Embodiment 1 will be described.

Figure 4:
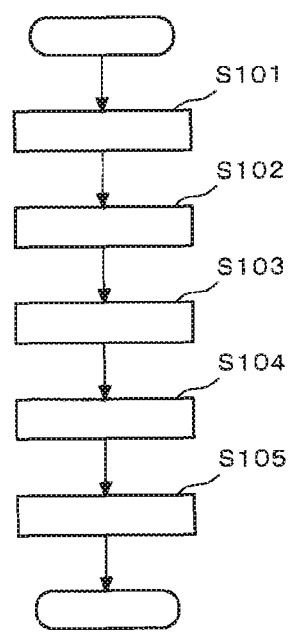
FIG. 4 is a flow chart illustrating a processing flow of the control system of the behavior control system according to Embodiment 1 of the present invention.

FIG. 4 is a flow chart illustrating a processing flow of the control system of the behavior control system according to Embodiment 1 of the present invention.

When the rider sets the adaptive cruise operation to ON, the control system 50 repeats the processing flow illustrated in FIG. 4 during traveling of the motorcycle 100.

(Lane Position Information Acquiring Step)

In Step S101, the lane position information acquiring unit 51 of the control system 50 acquires the lane position information serving as the information on the relative positions of the lane boundaries LV_R and LV_L with respect to the motorcycle 100 during traveling, based on the output of the image sensor 10.

(Tracking Target Vehicle Identifying Step)

In Step S102, the tracking target vehicle identifying unit 52 of the control system 50 identifies the tracking target vehicle AT, based on the output of the distance measuring sensor 20 and the lane position information acquired by the lane position information acquiring unit 51. In the example illustrated in FIG. 3, the preceding vehicle A1 which is located on the traveling lane L of the motorcycle 100 and has the shortest distance from the motorcycle 100 in the traveling direction of the motorcycle 100 is identified as the tracking target vehicle AT, among the preceding vehicles A1, A2, and A3 located within the detection range R of the detection device (for example, distance measuring sensor 20) for acquiring the traffic situation ahead of the motorcycle 100.

(Vehicle Position Information Acquiring Step)

In Step S103, the vehicle position information acquiring unit 53 of the control system 50 acquires the vehicle position information serving as the information on the relative position of the tracking target vehicle AT with respect to the motorcycle 100 during traveling.

(Control Amount Setting Step)

In Step S104, the control amount setting unit 54 of the control system 50 sets the control amount in the adaptive cruise operation, based on the vehicle position information acquired by the vehicle position information acquiring unit 53 and the output of the speed sensor 30.

(Execution Step)

In Step S105, the execution unit 55 of the control system 50 causes the motorcycle 100 to execute the adaptive cruise operation according to the control amount set by the control amount setting unit 54.

<Effect of Behavior Control System>

The effect of the behavior control system according to Embodiment 1 will be described.

The control system 50 is provided with the lane position information acquiring unit 51 acquiring the lane position information serving as the information on the relative positions of the lane boundaries LV_R and LV_L with respect to the motorcycle 100 during traveling. The tracking target vehicle identifying unit 52 identifies the tracking target vehicle AT, based on the lane position information acquired by the lane position information acquiring unit 51. That is, the tracking target vehicle AT is identified after it is determined where the traveling motorcycle 100 is located in the transverse direction of the traveling lane L. Therefore, it is possible to realize the appropriate adaptive cruise operation specialized in the motorcycle 100 having a characteristic that a degree of freedom of the traveling position is large in the transverse direction of the traveling lane L.

In the example illustrated in FIG. 3, for example, when the tracking target vehicle AT is identified without determination of where the traveling motorcycle 100 is located in the transverse direction of the traveling lane L, the preceding vehicle A3 having the shortest distance from the motorcycle 100 in the traveling direction of the motorcycle 100 is identified as the tracking target vehicle AT. Since the preceding vehicle A3 is a vehicle located on a lane different from the motorcycle 100, it is ineligible as the tracking target vehicle AT of the adaptive cruise operation. However, the motorcycle 100 has the characteristic that the degree of freedom of the traveling position is large in the transverse direction of the traveling lane L. Accordingly, a case is likely to occur in which the preceding vehicle A3 located on a lane different from the motorcycle 100 is identified as the tracking target vehicle AT. On the other hand, in order to cause such a case to be unlikely to occur, if the detection range R of the detection device (for example, distance measuring sensor 20) for acquiring the traffic condition ahead of the motorcycle 100 is set to be narrow, the preceding vehicle A1 is located outside the detection range R. Accordingly, a case where the motorcycle 100 tracks the preceding vehicle A2 traveling ahead of the preceding vehicle A1 and passes through the side of the preceding vehicle A1 which required to be originally tracked is likely to occur.

On the other hand, in the behavior control system according to Embodiment 1, the tracking target vehicle AT is identified after it is determined where the traveling motorcycle 100 is located in the transverse direction of the traveling lane L, and thus it is possible to appropriately identify the preceding vehicle A1 which required to be originally tracked while maintaining the detection range R of the detection device (for example, distance measuring sensor 20) for acquiring the traffic situation ahead of the motorcycle 100 at an appropriate area.

In particular, in a case where the motorcycle 100 performs group traveling with a plurality of motorcycles, that is, in a case where the preceding vehicles A1 and A2 are the motorcycles, the degrees of freedom of the traveling positions of the preceding vehicles A1 and A2 in the transverse direction of the traveling lane L also increase. Accordingly, it is more difficult to set the detection range R of the detection device (for example, distance measurement sensor 20) for acquiring the traffic situation ahead of the motorcycle 100 to be narrow. Therefore, identifying the tracking target vehicle AT after it is determined where the traveling motorcycle 100 is located in the transverse direction of the traveling lane L is particularly useful in a situation where the motorcycle 100 performs the group traveling.

Preferably, in the control system 50, the tracking target vehicle identifying unit 52 identifies the preceding vehicle A1 which is located on the traveling lane L of the motorcycle 100, and has the shortest distance from the motorcycle 100 in the traveling direction of the motorcycle 100 as the tracking target vehicle AT. Therefore, it is ensured that the appropriate adaptive cruise operation specialized in the motorcycle 100 is realized.

In particular, the lane position information acquiring unit 51 may acquire the lane margins LM_R and LM_L serving as the distances between the motorcycle 100 in the transverse direction of the traveling lane L and the lane boundaries LV_R and LV_L as the lane position information. The tracking target vehicle identifying unit 52 may determine whether or not the preceding vehicles A1, A2, and A3 are located on the traveling lane L, based on the preceding vehicle margins AM_1, AM_2, and AM_3 serving as the distances between the motorcycle 100 in the transverse direction of the traveling lane L and the preceding vehicles A1, A2, and A3 and the lane margins LM_R and LM_L. With such a configuration, it is further ensured that the appropriate adaptive cruise operation specialized in the motorcycle 100 is realized.

Furthermore, the preceding vehicle margins AM_1, AM_2, and AM_3 may be the distances from the motorcycle 100 to the positions closest to the motorcycle 100 of the preceding vehicles A1, A2, and A3 in the transverse direction of the traveling lane L. With such a configuration, it is possible to inhibit the determination of whether or not the preceding vehicles A1, A2, and A3 are located on the traveling lane L from being influenced by the vehicle width of the preceding vehicles A1, A2, and A3.

Although Embodiment 1 is described above, the present invention is not limited to the description of the embodiments. For example, all or only a portion of the embodiments may be implemented. In addition, the order of each of the steps in the control system 50 may be exchanged.

That is, in Embodiment 1, the case where the image sensor 10 captures both of the lane boundary LV_R and the lane boundary LV_L is described, and the image sensor 10 may capture only one of the lane boundary LV_R and the lane boundary LV_L as long as the control system 50 can acquire the width of the traveling lane L from other information source (for example, map information, and the like).

In addition, in Embodiment 1, the case where only the distances AD_1 and AD_2 related to the extracted preceding vehicles A1 and A2 are acquired after the preceding vehicles A1 and A2 located on the traveling lane L are extracted is described, and after the distances AD_1, AD_2, and AD_3 related to all the preceding vehicles A1, A2, and A3 are acquired, the preceding vehicle A1 which is located on the traveling lane L and has the shortest distance from the motorcycle 100 in the traveling direction of the motorcycle 100 may be extracted.

REFERENCE SIGNS LIST

1: Behavior control system
10: Image sensor
20: Distance measuring sensor
30: Speed sensor
50: Control system
51: Lane position information acquiring unit
52: Tracking target vehicle identifying unit
53: Vehicle position information acquiring unit
54: Control amount setting unit
55: Execution unit
90: Behavior control mechanism
100: Motorcycle
R: Detection range
L: Traveling lane
LV_R, LV_L: Lane boundary
A1, A2, A3: Preceding vehicle
AT: Tracking target vehicle
LM_R, LM_L: Lane margin
AM_1, AM_2, AM_3: Preceding vehicle margin
AD_1, AD_2: Distance from motorcycle to preceding vehicle

The invention claimed is:

1. A control system (50) which controls behavior of a motorcycle (100), the system comprising:
a tracking target vehicle identifying unit (52) that identifies a single tracking target vehicle (AT) of an adaptive cruise operation;
a vehicle position information acquiring unit (53) that acquires vehicle position information serving as information on a relative position of the tracking target vehicle (AT) with respect to the motorcycle (100) during traveling;
a control amount setting unit (54) that sets a control amount in the adaptive cruise operation, based on the vehicle position information acquired by the vehicle position information acquiring unit (53);
an execution unit (55) that causes the motorcycle (100) to execute the adaptive cruise operation according to the control amount set by the control amount setting unit (54); and
a lane position information acquiring unit (51) that acquires lane position information serving as information on relative positions of lane boundaries (LV_R, LV_L) with respect to the motorcycle (100) during traveling in a lane (L),
wherein the tracking target vehicle identifying unit (52):
recognizes a plurality of preceding vehicles (A1, A2) positioned in front of the motorcycle in the lane (L) and identifies the tracking target vehicle (AT) from at least one of the plurality of preceding vehicles in the lane (L), based on the lane position information acquired by the lane position information acquiring unit (51) and
identifies a preceding vehicle (A1) which is located on the lane (L) of the motorcycle (100) and has a shortest distance (Ad_x) among distances (AD_1, AD_2) from the motorcycle (100) in the traveling direction of the motorcycle (100) as the tracking target vehicle (AT), and
wherein other motorcycles are recognized as the plurality of preceding vehicles (A1, A2).

2. The control system according to claim 1,
wherein the lane position information acquiring unit (51) acquires lane margins (LM_R, LM_L) serving as distances from the motorcycle (100) to the lane boundaries (LV_R, LV_L) in a transverse direction of the traveling lane (L) as the lane position information, and
the tracking target vehicle identifying unit (52) determines whether or not preceding vehicles (A1, A2, A3) are located on the traveling lane (L), based on preceding vehicle margins (AM_1, AM_2, AM_3) serving as distances from the motorcycle (100) to the preceding vehicles (A1, A2, A3) in the transverse direction of the traveling lane (L), and the lane margins (LM_R, LM_L).

3. The control system according to claim 2,
wherein the preceding vehicle margins (AM_1, AM_2, AM_3) are distances from the motorcycle (100) to positions, closest to the motorcycle (100), of the preceding vehicles (A1, A2, A3) in the transverse direction of the traveling lane (L).

4. The control system according to claim 1,
wherein the vehicle position information is acquired, based on an output of a distance measuring sensor (20).

5. The control system according to claim 1,
wherein the lane position information is acquired, based on an output of an image sensor (10).

6. The control system according to claim 1, wherein
the control system is configured to control the behavior of the motorcycle based on the tracking target vehicle and not based on any of the other vehicles from the plurality of preceding vehicles by setting the control amount such that the shortest distance approaches a distance reference value.

7. A control method for controlling behavior of a motorcycle (100), the method comprising:
a tracking target vehicle identifying step (S102) of identifying a single tracking target vehicle (AT) of an adaptive cruise operation;
a vehicle position information acquiring step (S103) of acquiring vehicle position information serving as information on a relative position of the tracking target vehicle (AT) with respect to the motorcycle (100) during traveling;
a control amount setting step (S104) of setting a control amount in the adaptive cruise operation, based on the vehicle position information acquired in the vehicle position information acquiring step (S103);
an execution step (S105) of causing the motorcycle (100) to execute the adaptive cruise operation according to the control amount set in the control amount setting step (S104); and a lane position information acquiring step (S101) of acquiring a lane position information serving as information on relative positions of lane boundaries (LV_R, LV_L) with respect to the motorcycle (100) during traveling in a lane (L), wherein, in the tracking target vehicle identifying step (S102):

recognizes a plurality of preceding vehicles (A1, A2) positioned in front of the motorcycle in the lane (L) and identifies the tracking target vehicle (AT) from at least one of the plurality of preceding vehicles in the lane (L), based on the lane position information acquired by the lane position information acquiring unit (51); and identifies a preceding vehicle (A1) which is located on the lane (L) of the motorcycle (100) and has a shortest distance (Ad_x) among distances (AD_1, AD_2) from the motorcycle (100) in the traveling direction of the motorcycle (100) as the tracking target vehicle (AT), and wherein other motorcycles are recognized as the plurality of preceding vehicles (A1, A2).

8. The control method according to claim 7, wherein the control system is configured to control the behavior of the motorcycle based on the tracking target vehicle and not based on any of the other vehicles from the plurality of preceding vehicles by setting the control amount such that the shortest distance approaches a distance reference value.

\* \* \* \* \*